United States Patent
Gagnon

(12) 
(10) Patent No.: US 6,681,799 B2
(45) Date of Patent: Jan. 27, 2004

(54) EXHAUST GAS REGULATOR INCLUDING AN OVERMOLDED HOUSING

(75) Inventor: Frederic Gagnon, Chatham (CA)

(73) Assignee: Siemens VDO Automotive, Inc. (CA)

( * ) Notice: Subject to any disclaimer, the term of this patent is extended or adjusted under 35 U.S.C. 154(b) by 110 days.

(21) Appl. No.: 09/957,612

(22) Filed: Sep. 21, 2001

(65) Prior Publication Data

US 2003/0056835 A1 Mar. 27, 2003

(51) Int. Cl.[7] ............................................. F16K 31/04
(52) U.S. Cl. .................. 137/554; 251/129.11; 251/305; 251/367; 123/568.24
(58) Field of Search ...................... 137/554; 251/129.11, 251/305, 367; 123/568.24

(56) References Cited

U.S. PATENT DOCUMENTS

| | | | | |
|---|---|---|---|---|
| 3,931,955 A | * | 1/1976 | Jacobs .......................... | 251/305 |
| 4,313,592 A | * | 2/1982 | Baas ........................... | 251/305 |
| 5,073,735 A | | 12/1991 | Takagi ......................... | 310/71 |
| 5,134,327 A | | 7/1992 | Sumi et al. .................... | 310/43 |
| 5,148,678 A | * | 9/1992 | Ueda et al. .................... | 60/602 |
| 5,184,039 A | | 2/1993 | Kraft ........................... | 310/89 |
| 5,334,897 A | | 8/1994 | Ineson et al. .................. | 310/89 |
| 5,382,855 A | | 1/1995 | Cousin ......................... | 310/71 |
| 5,584,114 A | | 12/1996 | McManus ....................... | 29/596 |
| 5,609,184 A | * | 3/1997 | Apel et al. .................... | 137/554 |
| 5,806,169 A | | 9/1998 | Trago et al. ................... | 29/596 |
| 5,975,118 A | * | 11/1999 | Ulicny et al. .................. | 137/338 |
| 6,020,661 A | | 2/2000 | Trago et al. ................... | 310/43 |
| 6,075,304 A | | 6/2000 | Nakatsuka ..................... | 310/216 |
| 6,079,210 A | * | 6/2000 | Pintauro et al. ................ | 60/602 |

* cited by examiner

*Primary Examiner*—A. Michael Chambers

(57) ABSTRACT

A valve including a wall, a closure member, a motive force device, and a coupling member. The wall defines a flow passage that is disposed along a longitudinal axis. The closure member is disposed in the flow passage and is rotatable on a first axis that is oblique to the longitudinal axis. The closure member is rotatable between a first position that substantially prevents flow through the flow passage and a second position that generally permits flow through the flow passage. The motive force device rotates the closure member between the first position and the second position. The device includes a rotor that is rotatably supported by a bearing, a stator that is proximate to the rotor, and an overmolded housing that positions the stator with respect to the bearing. The coupling member conveys motive force from the device to rotation of the closure member.

20 Claims, 5 Drawing Sheets

EXHAUST GAS REGULATOR INCLUDING AN OVERMOLDED HOUSING

BACKGROUND OF THE INVENTION

It is believed that an Exhaust Gas Regulator ("EGR") consists of, among other components, a valve which is inserted into an exhaust gas flow passage. The valve is believed to control the flow rate of exhaust gas through the passage.

An EGR is also believed to comprise an actuator shaft that is connected to and manipulates the valve, and a motor that drives the actuator shaft. It is believed that the position of the valve within the exhaust gas flow passage subjects the valve to very high temperatures. It is further believed that the actuator shaft conducts heat energy from the valve to the motor, thereby increasing the operational temperature of the motor. It is yet further believed this temperature increase can adversely affect the motor's performance and possibly damage the motor.

SUMMARY OF THE INVENTION

The present invention provides a valve including a wall, a closure member, a motive force device, and a coupling member. The wall defines a flow passage that is disposed along a longitudinal axis. The closure member is disposed in the flow passage and is rotatable on a first axis that is oblique to the longitudinal axis. The closure member is rotatable between a first position that substantially prevents flow through the flow passage and a second position that generally permits flow through the flow passage. The motive force device rotates the closure member between the first position and the second position. The device includes a rotor that is rotatably supported by a bearing, a stator that is proximate to the rotor, and an overmolded housing that positions the stator with respect to the bearing. The coupling member conveys motive force from the device to rotation of the closure member.

The present invention also provides a method of fabricating a valve. The valve includes a wall that defines a flow passage, a closure member that is disposed in the flow passage, and a motive force device that rotates the closure member with respect to the wall. The method includes overmolding a housing around a plurality of stationary components of the motive force device, inserting through an opening in the housing at least one rotating component of the motive force device, and occluding the opening with a housing cap

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
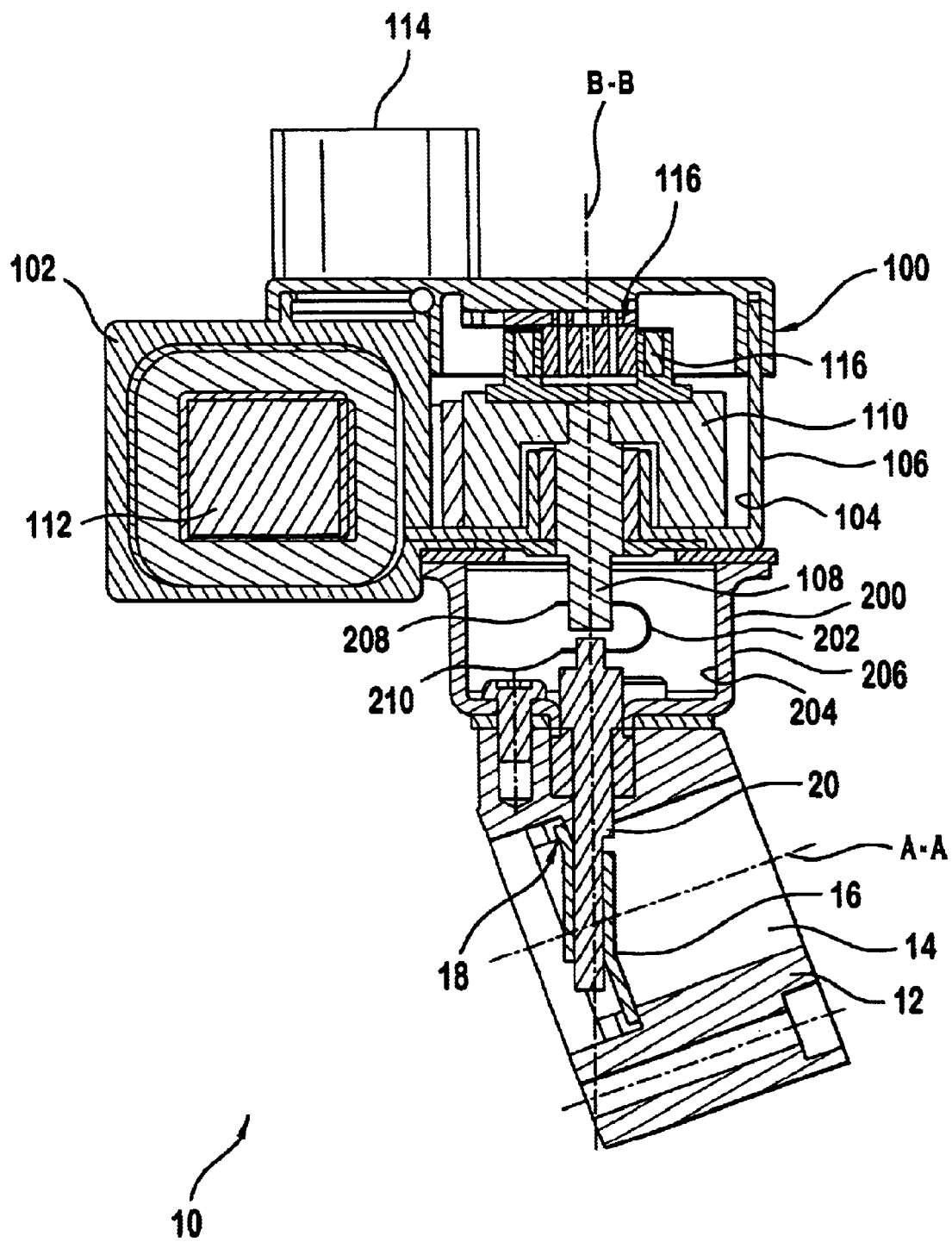
FIG. 1 is a schematic illustration of a regulator valve.

FIG. 1 shows a regulator valve 10 according to a preferred embodiment. The regulator valve 10 can be operated with a motive force device 100 that can include an electric motor as shown, for example, in FIGS. 2A, 2B, and 2C.

The regulator valve 10 includes a wall 12 defining a flow passage 14 disposed along a longitudinal axis A—A. A closure member 16 is disposed in the flow passage 14 for rotation about an axis B—B, which is oblique to the longitudinal axis A—A. The closure member 16 is movable, e.g., rotatable, to a first position to substantially prevent flow through the flow passage 14, and the closure member 16 is also movable to a second position to generally permit flow through the flow passage 14. The wall 12 can include a boss portion with a seal 18 for contiguously engaging the closure member 16 in the first position. The closure member 14 can be a butterfly valve, which can be coupled to a shaft 20 extending along the axis B—B.

The motive force device 100 is mounted with respect to the wall 12 and connected to the closure member 16 such that it can rotate the closure member 16 between the first position and the second position about the axis B—B. The motive force device 100 can be an electric stepper motor, an electric torque motor, or another device that provides a motive force. The motive force device 100 can include a housing 102 having an interior surface 104 and an exterior surface 106. The interior surface 104 can enclose a driveshaft 108 that is coupled to a rotor 110, and can surround a stator 112.

Preferably, the drive shaft 108 and rotor 110 rotate on the axis B—B. The stator 112 of the electric motor may, however, be disposed in the interior surface 104 of the housing 102 so as to be misaligned with the axis B—B. The misalignment can include being offset relative to the axis B—B, being relatively obliquely oriented, or a combination thereof.

Figure 2A:
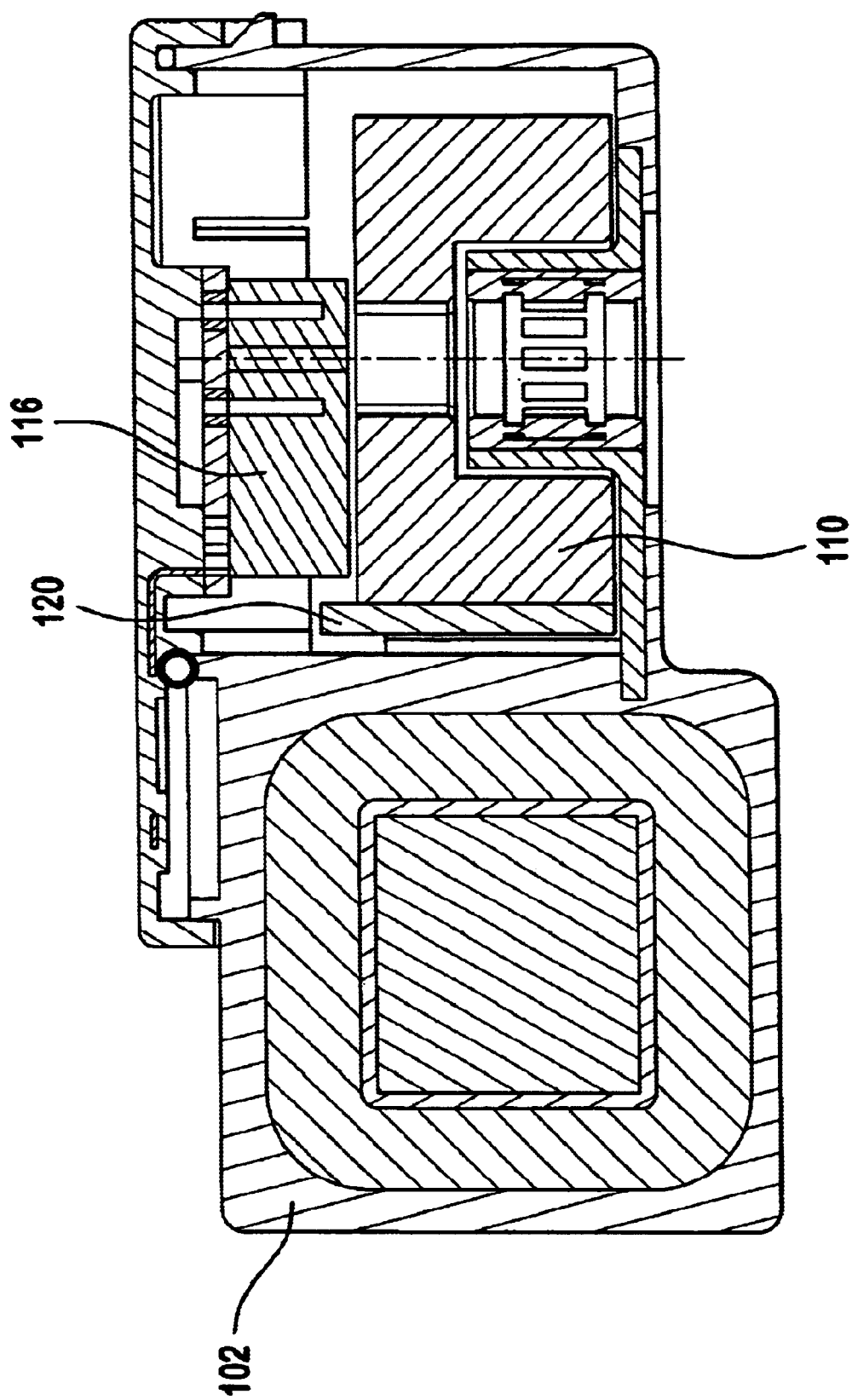
FIGS. 2A, 2B, and 2C are cross-sectional views showing a variation of a sensor for a motive force device of the regulator valve illustrated in FIG. 1.
Figure 2B:
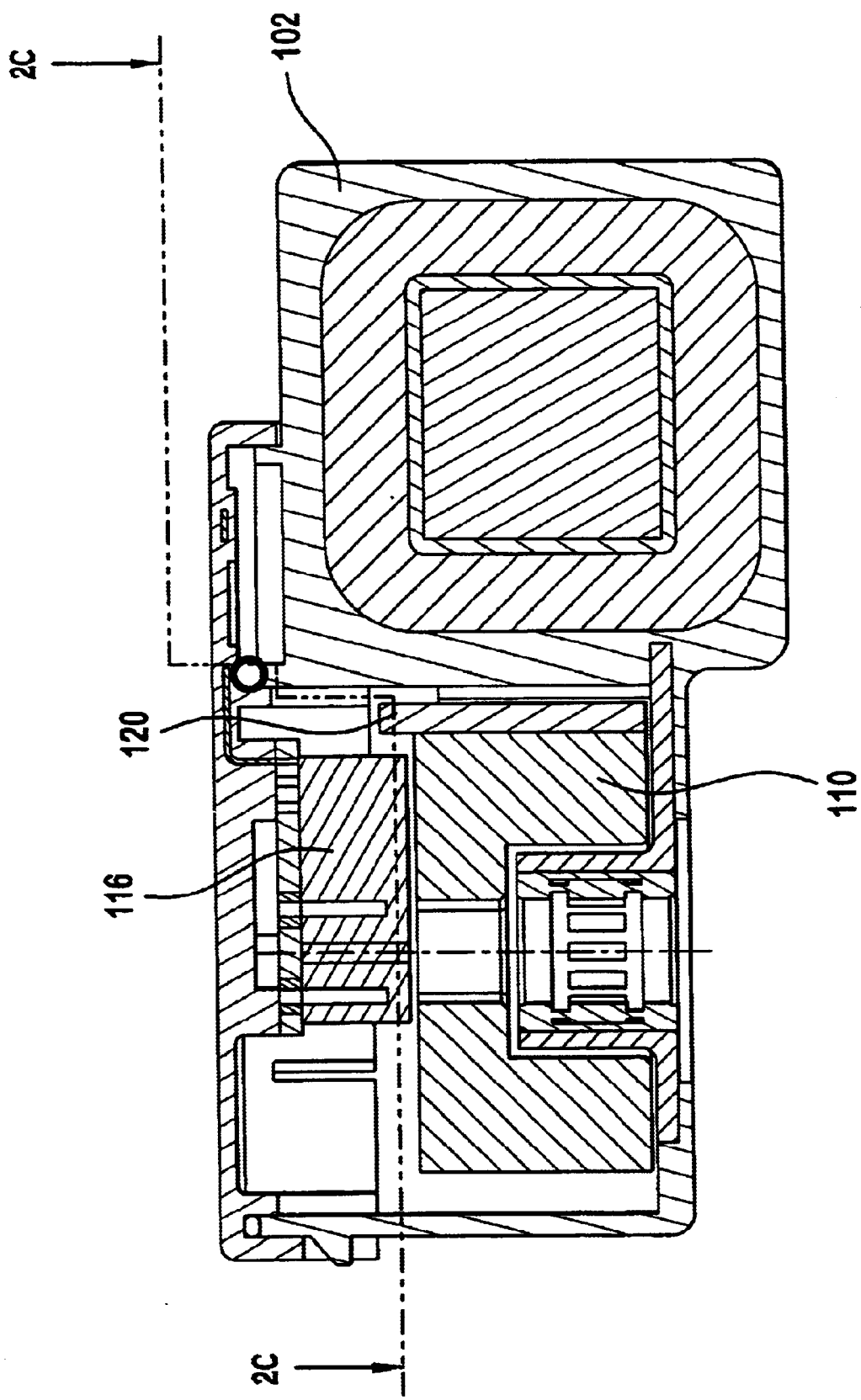
Figure 2C:
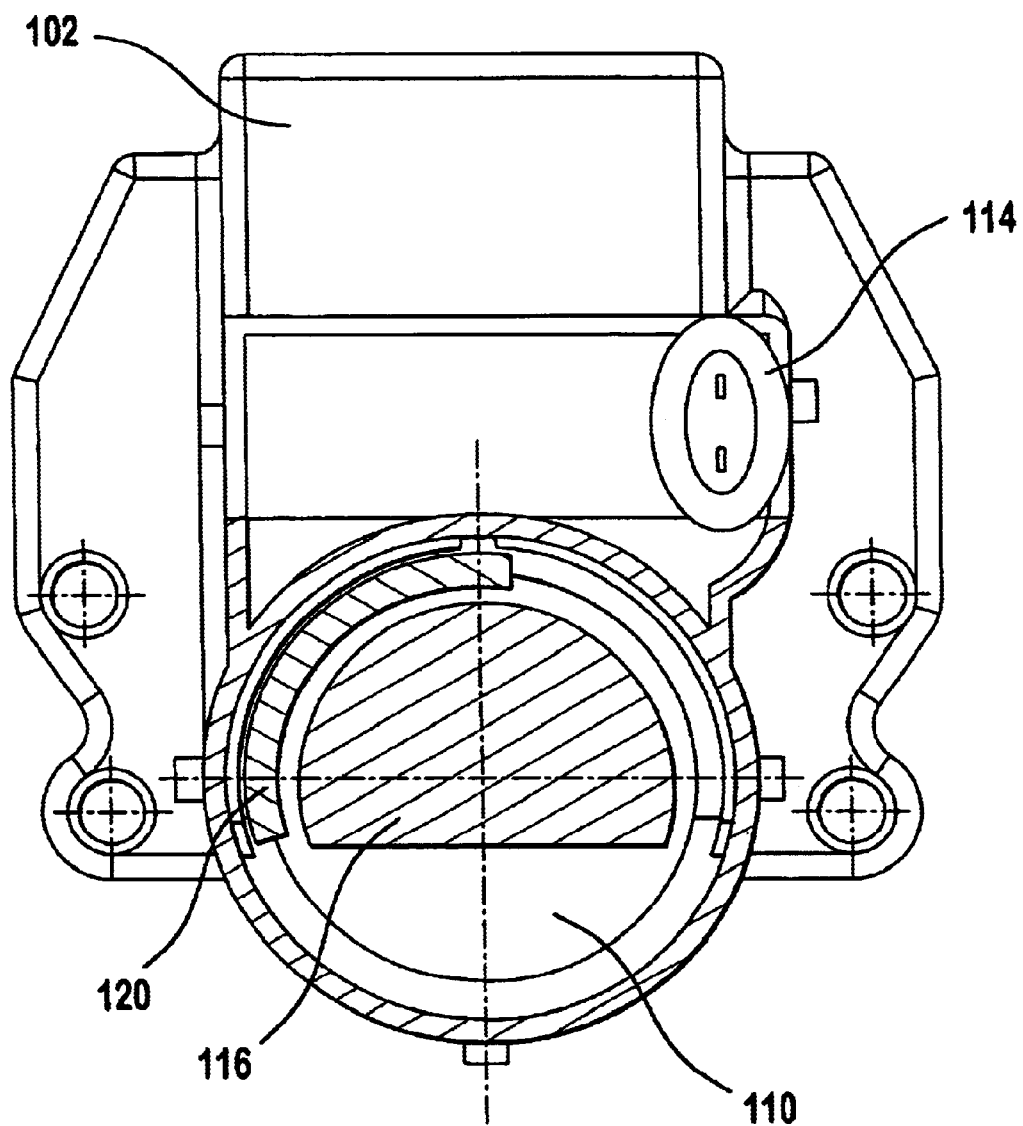

The motive force device 100 can also have a sensor disposed in the housing 102. The sensor can include a sensor rotor part 118, which may be coupled to the driveshaft 108, and a sensor stator part 116, which is disposed proximate the sensor rotor part 118. As shown in FIG. 1, the sensor rotor part 118 can be an annular magnetic member. A variation of the sensor is illustrated in FIGS. 2A, 2B, and 2C. In lieu of an annular magnetic member, the rotor 110 can include a magnetic part 120 that extends generally parallel with respect to the axis B—B and projects beyond an axial surface of the rotor 110. The sensor stator part 116, e.g., a Hall effect sensor, can be supported by a housing cap 102a such that the magnetic portion 120 rotates about the sensor stator part 116. FIG. 2B is a mirror of FIG. 2A.

Figure 3:
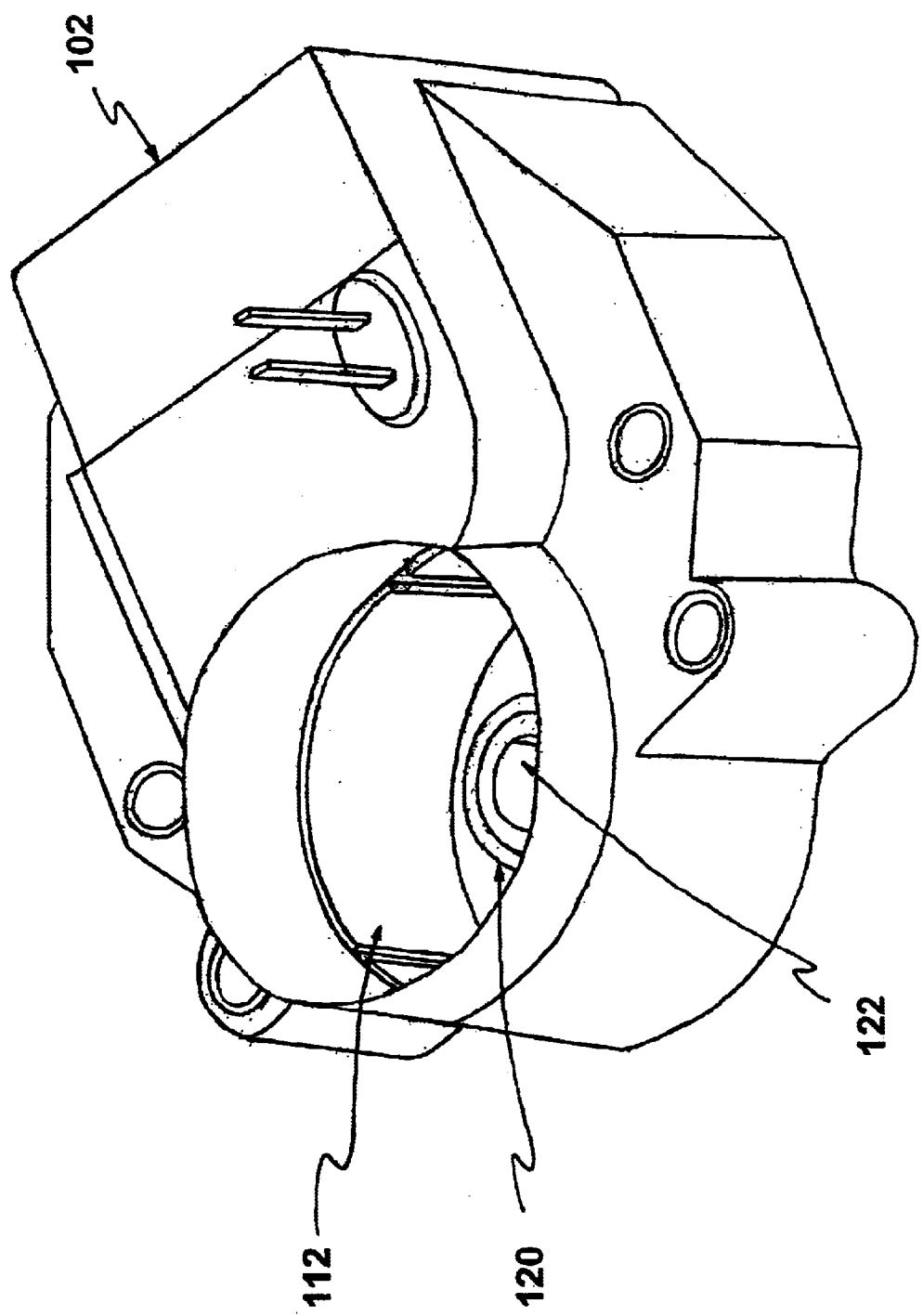
FIG. 3 is a perspective view of an overmolded motive force device for the regulator valve illustrated in FIG. 1.

Referring additionally to FIG. 3, the motive force device 100 is fabricated by overmolding the housing 102 so as to position with respect to one another the stator 112, which includes a bobbin 112a and a winding 112b, and a bearing housing 120. The bearing housing 120 supports a bearing 122 for rotatably mounting the driveshaft 118 with respect to the housing 102. The rotor 110, including the sensor rotor part 118 or the magnetic part 120, can then be loaded into the housing 102 and the housing cap 102a, including the sensor stator part 116, secured to the housing 102. A seal 102b, e.g., an O-ring, may be used to provide a fluid-tight seal between the housing 102 and the housing cap 102a.

An electrical connector 114 can be molded on the exterior surface 106 of the housing 102, and can project through the housing cap 102a. The electrical connector 114 provides a connection for the motive force device 100 to a power source (not shown). Leads from the winding 102b extend to one or more terminals (two are illustrated in FIGS. 2C and 3) of the electrical connector 114.

The regulator valve 10 also comprises a spacer 200 that supports the motive force device 100 with respect to the wall 12. The spacer 200 can have an inner wall 204 and an outer wall 206. The inner wall 204 defines a volume that contains a coupling member 202. The dimensions of the spacer 200 and the volume defined by the spacer 200 can be configured such that, depending on the operating temperature of the exhaust gas, the heat that is transferred from the exhaust gases in the flow passage 14 to the motive device 100 can be within a selected range of heat energy over the product of area and time, i.e., $BTU/(ft^2*hour)$ or $kW/m^2$.

The coupling member 202 can have a drive portion 208 that contiguously engages the driveshaft 108 and have a driven portion 210 that contiguously engages the shaft 20. The coupling member 202 performs a number of functions in addition to conveying force, e.g., torque, from the motive force device 100 to the closure member 16. The coupling member 202 can accommodate misalignment between the driveshaft 108 and the shaft 20. As discussed above, misalignment can include offset axes, obliquely related axes, or a combination of both. Preferably, the coupling member 202 is constructed of a resilient material, e.g., metal, that provides flexibility in order to accommodate the misalignment. The coupling member 202 can also thermally separate the driveshaft 18 and the shaft 20. In particular, the coupling member 202 can be constructed to minimize heat conduction from the shaft 20 to the driveshaft 108, and to maximize heat convection from the coupling member 202 to the volume defined by the inner wall 204. Preferably, the coupling member 202 is constructed with thin walls that provide a small cross-sectional area and a large surface area. The coupling member 202 can also "axially" bias the shaft 20 with respect to the driveshaft 108. Specifically, the coupling member 202 can apply a force that acts along the axis of the shaft 20 and concurrently apply a reaction force that acts along the axis of the driveshaft 108. These oppositely acting forces tend to eliminate looseness and avoid lost motion between the driveshaft 108 and the shaft 20.

The coupling member 202 can have a variety of configurations. For example, as shown in FIG. 1, the coupling member 202 can have a U-shaped configuration that extends between the drive portion 208 and the driven portion 210.

In operation, the heat transferred to the motive force device 100 is believed to be decreased by the spacer 200, which includes the defined volume, that couples the wall 12 to the housing 102; and by the member that couples the driveshaft 108 to the shaft 20. Also during operation of the valve 10, undesirable hysteresis due to misalignment can also be reduced or eliminated by member that couples the driveshaft 108 to the shaft 20.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A valve comprising:
    a wall defining a flow passage disposed along a longitudinal axis;
    a closure member disposed in the flow passage, the closure member being rotatable on a first axis oblique to the longitudinal axis, the closure member being rotatable between a first position substantially preventing flow through the flow passage and a second position generally permitting flow through the flow passage;
    a motive force device rotating the closure member between the first position and the second position, the device including a rotor being rotatably supported by a bearing, a stator proximate to the rotor, and at least one rotating component; and
    an overmolded housing positioning the stator with respect to the bearing, and forming a cavity that contains the at least one rotating component; and
    a coupling member conveying motive force from the device to rotation of the closure member.

2. The valve according to claim 1, wherein the overmolded housing comprises a unitary homogenous material.

3. The valve according to claim 1, wherein the stator comprises a bobbin and an electric winding around the bobbin.

4. The valve according to claim 3, wherein the overmolded housing comprises at least one terminal extending from the overmolded housing, the at least one terminal being electrically coupled to the winding.

5. The valve according to claim 1, further comprising:
    a housing cap being coupled to the housing, the housing cap and the housing generally enclosing the rotor and the stator.

6. The valve according to claim 5, further comprising:
    a seal being interposed between the housing and the housing cap, the seal providing a fluid-tight barrier between the housing and the housing cap.

7. The valve according to claim 1, wherein the closure member comprises a butterfly valve, and the device comprises an electric torque motor.

8. The valve according to claim 1, further comprising:
    a sensor detecting the angular position of the rotor with respect to the stator, the sensor being at least partially in the cavity.

9. The valve according to claim 8, wherein the sensor comprises a first portion fixed with respect to the rotor and a second portion fixed with respect to the overmolded housing.

10. The valve according to claim 9, wherein the first portion of the sensor is non-contacting with respect to the second portion of the sensor.

11. The valve according to claim 9, wherein the overmolded housing positions the second portion of the sensor with respect to the stator and to the bearing.

12. The valve according to claim 11, wherein the overmolded housing positions the bearing housing with respect to the stator, and the bearing element contiguously engages the rotor.

13. The valve according to claim 1, wherein the bearing comprises a bearing housing and a bearing element, the bearing housing and the bearing element being at least partially in the cavity.

14. The valve according to claim 1, further comprising:
   a spacer insulating the device with respect to the wall, and the spacer generally defining a volume containing the coupling member.

15. The valve according to claim 1, wherein the valve is an exhaust back pressure valve.

16. The valve according to claim 1, wherein the valve is an exhaust gas recirculation valve.

17. A method of fabricating a valve, the valve including a wall defining a flow passage, a closure member disposed in the flow passage, and a motive force device rotating the closure member with respect to the wall, the method comprising:
   overmolding a housing around a plurality of stationary components of the motive force device to locate the stationary components of the motive force device and provide an opening to a cavity formed in the housing, the stationary components including at least a stator, bobbin and winding; and
   inserting through the opening in the housing at least one rotating component of the motive force device; and
   occluding the opening with a housing cap.

18. The method according to claim 17, further comprising:
   connecting with an insulating spacer the housing to the wall; and
   connecting with a coupling member the at least one rotating component of the motive force device to the closure member.

19. The method according to claim 17, wherein the overmolding comprises positioning the stator of the motive force device with respect to a bearing supporting the at least one rotating component of the motive force device.

20. The method according to claim 17, wherein the occluding comprises installing a first portion of a sensor fixed with respect to the housing cap, and the inserting comprises installing a second portion of a sensor fixed with respect to the at least one rotating component of the motive force device, wherein the sensor detects the angular position of the at least one rotating component of the motive force device with respect to the housing.

* * * * *